(12) United States Patent
Mackey

(10) Patent No.: US 7,965,281 B2
(45) Date of Patent: Jun. 21, 2011

(54) UNAMBIGUOUS CAPACITANCE SENSING USING SHARED INPUTS

(75) Inventor: Bob Lee Mackey, Santa Clara, CA (US)

(73) Assignee: Synaptics, Inc., Santa Clara, CA (US)

( * ) Notice: Subject to any disclaimer, the term of this patent is extended or adjusted under 35 U.S.C. 154(b) by 1228 days.

(21) Appl. No.: 11/543,397

(22) Filed: Oct. 3, 2006

(65) Prior Publication Data
US 2008/0079699 A1    Apr. 3, 2008

(51) Int. Cl.
*G09G 5/00* (2006.01)
(52) U.S. Cl. ...................... 345/174; 178/18.06
(58) Field of Classification Search .......... 345/173–179; 178/18.01, 18.06, 18.03
See application file for complete search history.

(56) References Cited

U.S. PATENT DOCUMENTS

| 5,508,700 | A | | 4/1996 | Taylor et al. |
| 5,861,875 | A | * | 1/1999 | Gerpheide ................... 345/174 |
| 7,109,978 | B2 | | 9/2006 | Gillespie et al. |
| 2003/0103043 | A1 | | 6/2003 | Mulligan et al. |
| 2005/0179672 | A1 | | 8/2005 | Chiu et al. |
| 2006/0032680 | A1 | | 2/2006 | Elias et al. |
| 2007/0229468 | A1 | * | 10/2007 | Peng et al. ................... 345/173 |

FOREIGN PATENT DOCUMENTS

JP    2005326905    11/2005

OTHER PUBLICATIONS

ISA/US, International Search Report and Written Opinion for International Application No. PCT/US2007/079594, 8 pages, Feb. 12, 2008.

* cited by examiner

*Primary Examiner* — Regina Liang (57) ABSTRACT

Capacitance sensing apparatuses are described. The apparatus includes capacitance sensor elements that traverse a sensing region. The apparatus also includes sensor circuitry that has multiple inputs. More than one of the capacitance sensor elements are electrically coupled to the same input. A position of an object along an axis of the sensing region is unambiguously identified according to which subset of the inputs senses a change in capacitance that is induced when the object is proximate to the sensing region.

27 Claims, 7 Drawing Sheets

```
┌─────────────────────────────────────────┐
│ SENSE MEASURES OF CAPACITANCE AT A FIRST│
│ PLURALITY OF INPUTS COUPLED TO A FIRST  │
│ PLURALITY OF CAPACITANCE SENSOR ELEMENTS│
│                   610                   │
└─────────────────────────────────────────┘
                    │
                    ▼
┌─────────────────────────────────────────┐
│ COMPARE CAPACITANCE MEASURES BETWEEN    │
│ SELECTED COMBINATIONS OF THE FIRST      │
│ PLURALITY OF INPUTS TO IDENTIFY A SUBSET│
│           OF THE INPUTS                 │
│                   620                   │
└─────────────────────────────────────────┘
                    │
                    ▼
┌─────────────────────────────────────────┐
│  USE THE SUBSET TO IDENTIFY A SUB-REGION│
│         OF A SENSING REGION             │
│                   630                   │
└─────────────────────────────────────────┘
```

SET A VALUE FOR A FIRST VARIABLE BY COMPARING A FIRST MEASURE OF CAPACITANCE AT A FIRST INPUT AND A SECOND MEASURE OF CAPACITANCE AT A SECOND INPUT
710

SET A VALUE FOR A SECOND VARIABLE BY COMPARING A THIRD MEASURE OF CAPACITANCE AT A THIRD INPUT AND A FOURTH MEASURE OF CAPACITANCE AT A FOURTH INPUT
720

USE THE VALUES OF THE FIRST AND SECOND VARIABLES TO IDENTIFY A SUB-REGION OF A SENSING REGION
730

FIG. 7

UNAMBIGUOUS CAPACITANCE SENSING USING SHARED INPUTS

BACKGROUND

Conventional computing devices enable a user to input a choice or a selection in different ways. For example, a user can use an alphanumeric keyboard, a cursor control device or a microphone to indicate a choice or selection. Moreover, touch sensing technology can be used to provide an input selection to a computing device or other types of electronic devices. Within the broad category of touch sensing technology there exist capacitance sensing touch sensors, commonly referred to as touchpads.

A capacitance sensing apparatus can include a number of capacitance sensor elements (e.g., wires) underlying a sensing region. If an object such as a user's finger is in proximity to (or in contact with) the sensing region, a capacitance is induced in one or more of the capacitance sensor elements, generating a signal. The capacitance sensor elements are coupled to sensor circuitry (e.g., an integrated circuit), which interprets signals received from the capacitance sensor elements.

The sensed position of a finger or object relative to the touchpad should be unambiguous. That is, for example, the response of the sensing apparatus to a finger at any location in the sensing region of the capacitance sensing apparatus should be different from the response at other locations on the touch sensor.

The accuracy to which a position within the sensing region can be determined is influenced by the number of capacitance sensor elements underlying the sensing region. For example, the granularity of the sensing region can be increased by increasing the number and hence the density of capacitance sensor elements. Increasing the number of capacitance sensor elements can also improve signal-to-noise ratios.

If a greater number of capacitance sensor elements are used, then an integrated circuit coupled to those sensor elements would appear to need more inputs or channels. Consequently, costs associated with the sensor circuitry may be increased. Furthermore, commercially available (e.g., "off the shelf") integrated circuits may not have enough inputs to accommodate a large number of capacitance sensor elements. Hence, either the number of capacitance sensor elements is constrained by the number of inputs on existing integrated circuits, or specialized integrated circuits designed with a larger number of inputs are needed.

Accordingly, a capacitance sensing apparatus that can be used to accurately indicate the position of an object or finger, but that avoids the design and cost issues mentioned above, would be advantageous.

SUMMARY

Embodiments in accordance with the present invention pertain to different types of capacitance sensing apparatuses that address one or more of the problems mentioned above. In one embodiment, a capacitance sensor apparatus includes capacitance sensor elements that traverse a sensing region. The apparatus also includes sensor circuitry that has multiple inputs. More than one of the capacitance sensor elements are electrically coupled to the same input. A position of an object along an axis of the sensing region is unambiguously identified according to which subset of the inputs senses a change in capacitance that is induced when the object is proximate to the sensing region.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
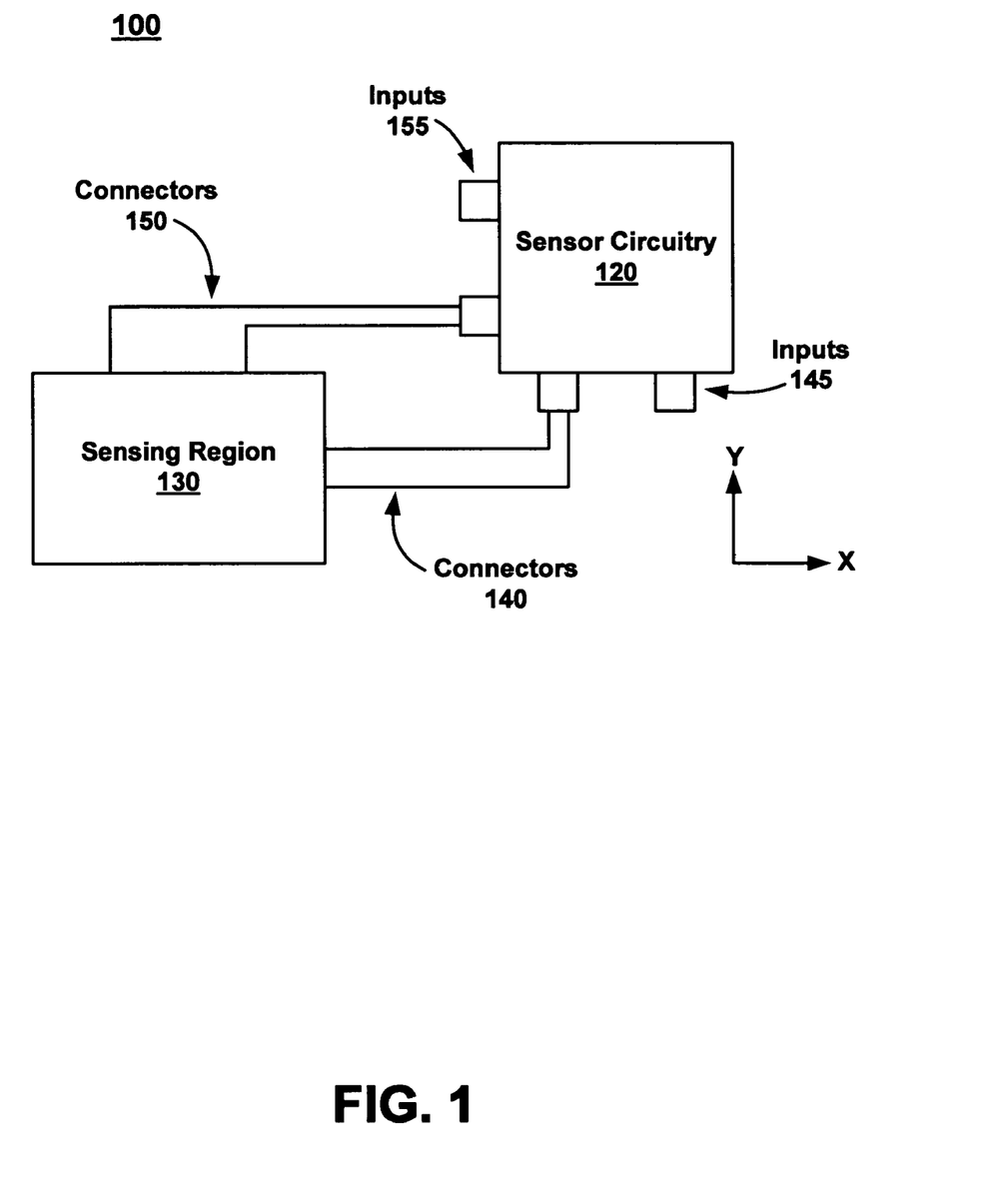
FIG. 1 is a block diagram of an example capacitance sensing apparatus according to embodiments of the invention.

FIG. 1 is a block diagram of an example capacitance sensing apparatus according to embodiments of the invention. The capacitive sensing apparatus 100 can be utilized to communicate user input (e.g., using a user's finger, a probe, etc.) to a computing device or other electronic device. For example, capacitance sensing apparatus 100 can be implemented as a capacitive touch sensor device that can be placed over an underlying image or an information display device (not shown). In this manner, a user would view the underlying image or information display by looking through the substantially transparent sensing region 130 of capacitance sensing apparatus 100. One or more embodiments in accordance with the present invention can be incorporated with a capacitive touch sensor device similar to capacitance sensing apparatus 100.

Underlying or, more generally, traversing the sensing region 130 is a number of capacitance sensor elements (see FIGS. 2, 3, 4 and 5 for examples). Electrical conductors or connectors 140 and 150 can be utilized for coupling the capacitance sensor elements with the inputs 145 and 155 of sensing circuitry 110 (e.g., an integrated circuit), thereby enabling the operation of capacitance sensing apparatus 100. Connectors 140 and 150 may each include one or more conductive coupling elements or traces. A position within sensing region 130 can be determined in one dimension or in two dimensions. In one embodiment, signals carried by connectors 140 are used to identify a position in one dimension (e.g., in the x-direction), while signals carried by connectors 150 are used to identify that position in a second dimension (e.g., in the y-direction).

Instead of a transparent substrate, the capacitance sensing apparatus 100 can be implemented using one or more opaque materials as a substrate. Furthermore, sensing region 130 is not limited to a rectilinear shape. For example, sensing region 130 may be curved or round in shape.

The capacitance sensing apparatuses described herein may be used to detect objects on either side of the substrate onto which they are fabricated. To prevent detection of signals of noise from one side of the substrate, a ground plane or a driven shield conductor may be utilized to shield that side or a portion of either side.

According to embodiments of the present invention, as described more fully in conjunction with the FIGS. 2 and 3 below, the number of inputs 145 and 155 is less than the number of capacitance sensor elements. More specifically, two (2) or more capacitance sensor elements may be electrically coupled to the same input. Thus, a larger number of capacitance sensor elements can be used with a fewer number of inputs, reducing costs associated with the sensor circuitry 120 and perhaps allowing the use of existing or commercially available integrated circuits. Moreover, the 2 or more capacitance sensor elements are electrically coupled to the same input without the added complexity and cost of intervening switches or the like. As will be seen, the order in which the capacitance sensor elements are coupled to the inputs is such that an unambiguous position in sensing region 130 can be determined based on which subset of the inputs senses a change in capacitance when an object is proximate to or in contact with the sensing region 130.

Figure 2:
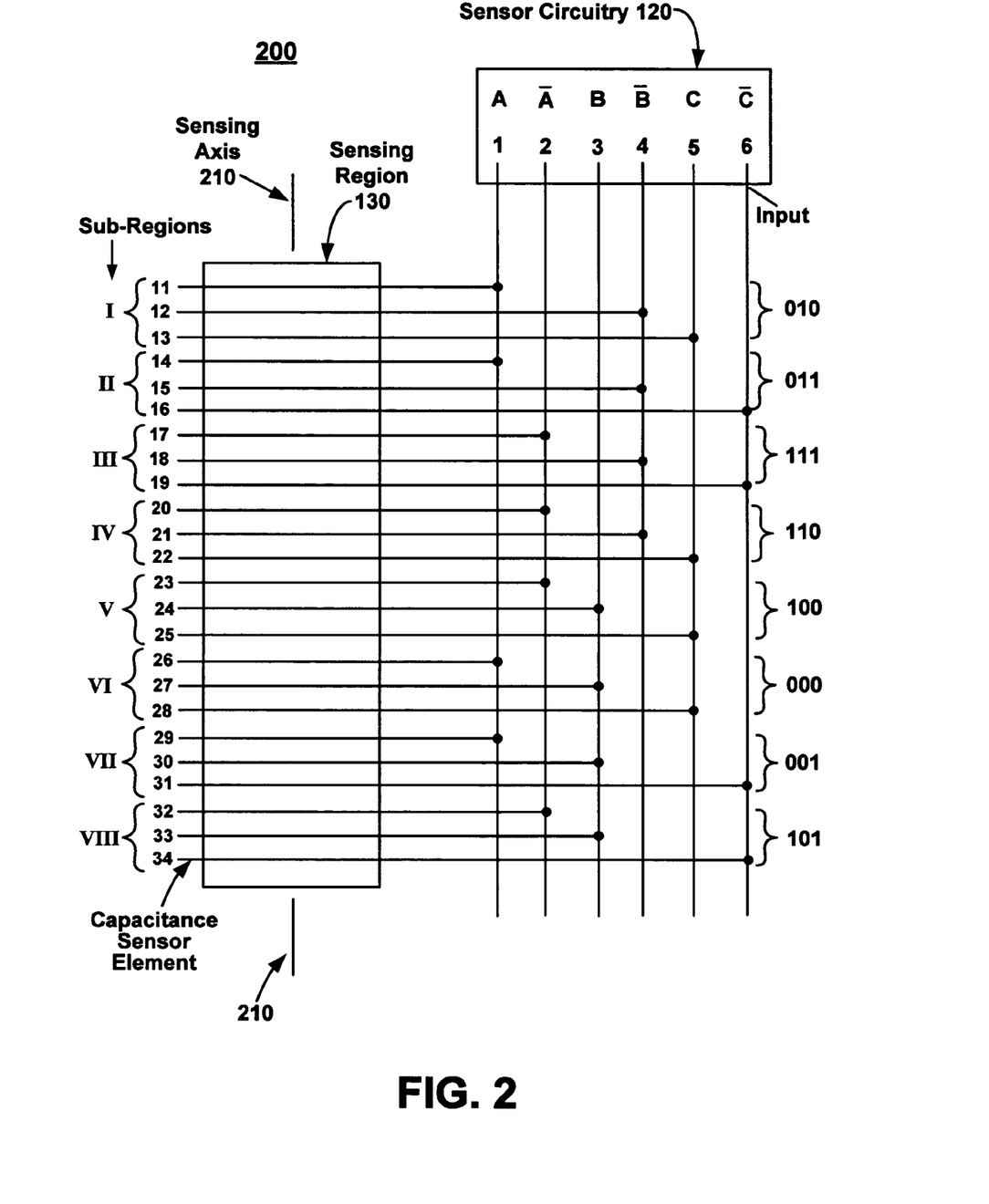
FIG. 2 is an example wiring diagram according to an embodiment of the present invention.

FIG. 2 illustrates an embodiment of a capacitance sensing apparatus 200 according to the present invention. In this example, capacitance sensor elements 11-34 traverse the sensing region 130. In one embodiment, the capacitance sensor elements 11-34 are evenly spaced. The capacitance sensor elements 11-34 are electrically coupled (connected) to the inputs 1-6 of sensor circuitry 120. Although 24 sensor elements and six (6) inputs are shown in FIG. 2, the present invention is not so limited.

In the example of FIG. 2, three (3) binary bits are used to indicate a position in the direction indicated by sensing axis 210. Each of the sub-regions I, II, III, IV, V, VI, VII and VIII is identified by a unique combination of the 3 bits. In the example of FIG. 2, sub-region I is encoded as 010, sub-region II as 011, sub-region III as 111, sub-region IV as 110, and so on.

Sub-regions may also be referred to as cells. In general, a sub-region is an area of sensing region 130 that is identified by a single address (e.g., by the same encoded value). Thus, in the example of FIG. 2, a sub-region is an area of sensing region 130 that is identified by the same 3-bit value.

If an object such as a user's finger is in proximity to (or in contact with) the sensing region 130, a capacitance (or voltage or current), or a change (e.g., increase) in capacitance (or voltage or current), is induced in one or more of the capacitance sensor elements 11-34, depending on the location of the object. The change in capacitance is sensed on a corresponding input of sensor circuitry 120. For example, a change in capacitance induced in capacitance sensor element 11 is sensed on input 1.

In one embodiment, the strength of an input signal A sensed on input 1 is compared to the strength of an input signal $\overline{A}$ (A-bar) sensed on input 2 to determine whether a first variable (e.g., a first bit) has a value of either 0 or 1. If the signal $\overline{A}$ on input 2 is greater than the signal A on input 1, then the first bit has a value of 1, for example; if signal A is greater than signal $\overline{A}$ then the first bit has a value of 0. Similarly, the strengths of input signals B and $\overline{B}$ (B-bar) on inputs 3 and 4, respectively, are compared to determine a value of either 0 or 1 for a second variable (e.g., a second bit), and the strengths of input signals C and $\overline{C}$ (C-bar) on inputs 5 and 6, respectively, are compared to determine a value of either 0 or 1 for a third variable (e.g., a third bit). The values of the three variables/bits identify a corresponding sub-region within sensing region 130.

By comparing the signal strengths as just described, it is not necessary to account for common mode signals that may be present on the various channels. In other words, even in the absence of an object, a measurable signal may be present at each of the inputs 1-6. By comparing signals on the inputs 1-6 as described above, a change (e.g., an increase) in signal strength on an input can be readily detected. Moreover, if the relative strengths of the signals are used, it is not necessary to determine (e.g., measure) an absolute value for each of the signals. Alternatively, absolute values of the various signal strengths can be determined and subsequently used, for example to identify a sub-region address in a manner similar to that described above.

In operation, if an object is brought in proximity to or in contact with sensing region 130, the 3-bit value identifies which one of the sub-regions is closest to the object, thus indicating a position of the object along sensing axis 210. If the object is in proximity to sub-region II, for example, a response would be provoked on capacitance sensor elements 14, 15 and/or 16. That is, a change or increase in capacitance would be induced on capacitance sensor elements 14, 15 and/or 16. The responses on capacitance sensor elements 14, 15 and/or 16 are sensed on inputs 1, 4 and 6. More specifically, in one embodiment, the strengths of the input signals A, $\overline{B}$ and $\overline{C}$ sensed at inputs 1, 4 and 6 are compared, respectively, to the strengths of the input signals $\overline{A}$, B and C sensed on inputs 2, 3 and 5. The responses on capacitance sensor elements 14, 15 and/or 16 are thereby converted to the encoded value 011, for example, which sensor circuitry 120 identifies as the address for sub-region II.

Thus, in the example of FIG. 2, 6 sensing channels or inputs 1-6 are used to indicate a 3-bit response to an object in proximity to or in contact with sensing region 130, and the values of those 3 bits are used to unambiguously identify one of eight (8) sub-regions. It is recognized that the example of FIG. 2 provides a relatively coarse measurement of position within sensing region 130. Finer measurements of position can be determined by interpolating signals. Finer measurements of position can also be achieved by increasing the number of capacitance sensor elements and the number of sensing channels. For example, with only 12 sensor channels, sensing region 130 can be divided into 64 sub-regions with 12 capacitance sensor elements per sub-region (768 capacitance sensor elements in total). With only 14 sensor channels, sensing region 130 can be divided into 128 sub-regions with 14 capacitance sensor elements per sub-region (1992 capacitance sensor elements in total). In general, for a positive integer value of N, sensing region 130 can be divided into $2^N$ sub-regions, with N capacitance sensor elements per sub-region served by 2N sensor channels or inputs.

Interestingly, a standard XGA (extended graphics array) display has a resolution of 1024×768 pixels. Thus, in accordance with embodiments of the present invention, the wiring of an XGA-standard liquid crystal display (LCD), for example, can be utilized as a capacitive touch sensor device with sensor circuitry having only 12 or 14 inputs. As will be seen from the discussion of FIG. 5 below, the position of an object can be sensed in 2 dimensions. Thus, sensor circuitry having 26 inputs (e.g., one or more integrated circuits having at least that number of inputs) can be used with the wiring of an XGA-standard LCD display to sense position in 2 dimensions.

In general, according to embodiments of the present invention, the interconnections between capacitance sensor elements and inputs are arranged such that the response of the capacitance sensing apparatus to a finger at any location in sensing region 130 is different from the response at other locations. The amount of information conveyed by the responses of the capacitance sensor elements to an object can be most fully exploited if the function that describes the sensing space of the input signal associated with one of the bit values (e.g., input signal A or $\overline{A}$ corresponding to the first bit value and the input pair consisting of inputs 1 and 2) is mathematically orthogonal to the function that describes the sensing space of the input signal associated with another one of the bit values (e.g., input signal B or $\overline{B}$ corresponding to the second bit value and the input pair consisting of inputs 3 and 4), so that only one capacitance sensor element of each input pair is needed per sub-region. Two functions are mathematically orthogonal if the integral of their inner product is zero.

In one embodiment, each input pair (e.g., inputs 1 and 2, corresponding to input signals A and $\overline{A}$ respectively) separates a corresponding portion of sensing region 130 into equal-sized portions. Thus, for example, based on the wiring diagram of FIG. 2, the value of the first bit (0 or 1) identifies four (4) sub-regions of sensing region 130. For example, the addresses of 4 sub-regions in sensing region 130 each have a first bit value of 0, and the addresses of 4 other sub-regions in sensing region 130 each have a first bit value of 1. Thus, if the first bit has a value of 0, then a subset of 4 candidate sub-regions (e.g., sub-regions I, II, VI and VII) is identified. In a similar manner, within the candidate subset of sub-regions, the value of the second bit (0 or 1) identifies 2 sub-regions, and the value of the third bit (0 or 1) identifies one of those 2 sub-regions. Thus, in the example of FIG. 2, the first bit essentially halves sensing region 130, the second bit halves the subset of sub-regions identified by the first bit, and the third bit halves the subset of sub-regions identified by the third bit. The present invention is not limited to binary addresses that halve the sensing region in this manner. For example, ternary addresses or addresses using other number system bases may be used.

In the example of FIG. 2, the capacitance sensor elements 11-34 and the inputs 1-6 are connected such that adjacent regions are identified using encoded values that have a Hamming distance of one; that is, they are Gray coded. Thus, only one of the 3 bits changes value from one sub-region to the next. The use of Gray coding in this manner can help reduce the potential for ambiguity in identifying a sub-region, in particular when an object is on or near the border between 2 adjacent sub-regions.

For example, suppose that an object was situated in a position that in effect straddled sub-regions I and II such that the response on capacitance sensor element 13 cannot be distinguished from the response on capacitance sensor element 16 (that is, input signals C and $\overline{C}$ are essentially equal in strength). In this case, regardless of to what degree the object was sensed on capacitance sensor element 11 versus capacitance sensor element 14, or capacitance sensor element 12 versus capacitance sensor element 15, input signal A would be stronger than input signal $\overline{A}$ and input signal $\overline{B}$ would be stronger than input signal B. Sensor circuitry 120 would encode the input signals as 01X, where the value of "X" is ambiguous because, in this example, input signals C and $\overline{C}$ are essentially equal. Sensor circuitry 120 interprets the encoded value 01X as corresponding to a point on the border between sub-regions I and II, thus not only addressing the potential ambiguity but also accurately locating the object within sensing region 130.

Embodiments in accordance with the present invention are not limited to Gray coded sequences. In some embodiments, the capacitance sensor elements underlying sensing region 130 are connected to the inputs of sensor circuitry 120 such that adjacent regions are identified using encoded values that have a Hamming distance of 2 or more, or such that adjacent regions are identified using encoded values, where each bit is run length limited and has a run length of at least 2. For example, in an embodiment in which there are 32 sub-regions, with 12 capacitance sensor elements per sub-region interconnected to 6 inputs, each sub-region can be identified by a 6-bit string such that each sub-region has a Hamming distance of two from its neighbors, each of the bits having a minimum run length of 2 and a maximum run length of five (5) (that is, the first bit in the string has a minimum run length of 2 and a maximum run length of 5, the second bit in the string has the same characteristics, and so on).

Furthermore, embodiments in accordance with the present invention are not limited to binary encoding sequences. Ternary sequences or sequences using other number system bases may be used.

Figure 3:
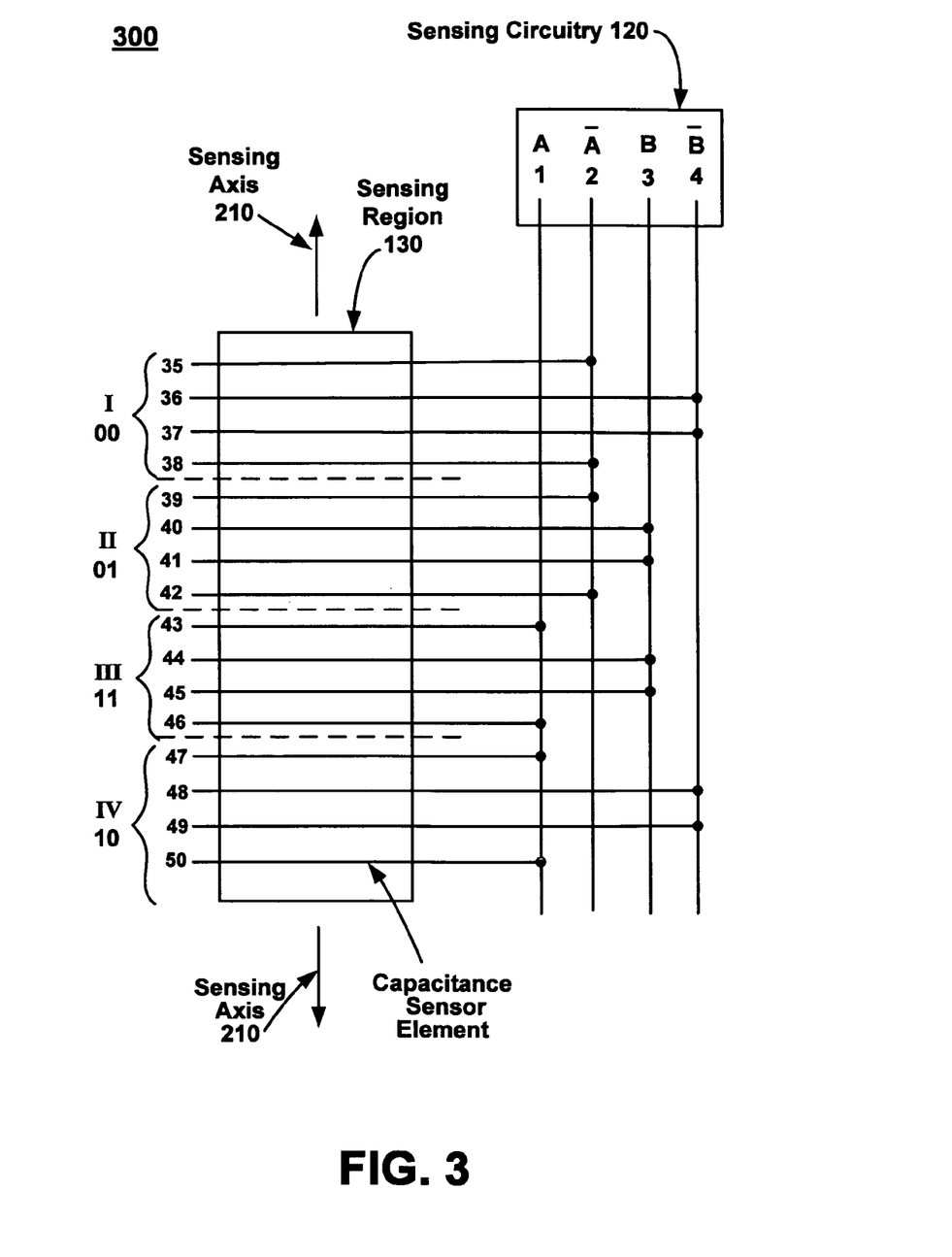
FIG. 3 is another example wiring diagram according to an embodiment of the present invention.

FIG. 3 illustrates an embodiment of a capacitance sensing apparatus 300 according to the present invention. In this example, capacitance sensor elements 35-50 traverse the sensing region 130. The capacitance sensor elements 35-50 are electrically coupled (connected) to the inputs 1-4 of sensor circuitry 120. In one embodiment, the capacitance sensor elements 35-50 are evenly spaced.

In the example of FIG. 3, 2 binary bits are used to indicate a position in the direction indicated by sensing axis 210. As described above, the first bit has a value of either 0 or 1 depending on the relative strengths of input signals A and $\overline{A}$ and the second bit has a value of either 0 or 1 depending on the relative strengths of input signals B and $\overline{B}$. Although 16 sensor elements, 4 inputs and 2 bits are used in this example, the present invention is not so limited.

In the example of FIG. 3, each sub-region includes at least one pair of capacitance sensor elements that is connected to the same input. For instance, both capacitance sensor elements 35 and 38 in sub-region I are connected to input 2. In comparison, in the example of FIG. 2, each sub-region includes only a single capacitance sensor element connected to an input (that is, although a particular input can be coupled to more than one capacitance sensor element, in the example of FIG. 2, each input is coupled to only one capacitance sensor element per sub-region).

Continuing with reference to FIG. 3, within each sub-region, the capacitance sensor elements are arranged in mirror-image fashion according to which of the inputs they are respectively connected. In other words, if each sub-region is visualized as being intersected (e.g., bisected) by a line of symmetry perpendicular to the sensing axis 210, then one of the capacitance sensor elements of a pair connected to a same input is disposed on one side of the line of symmetry, and the other capacitance sensor element in that pair is disposed on the other side of the line of symmetry. For instance, both capacitance sensor elements 35 and 38 in sub-region I are connected to input 2 (corresponding to input signal $\overline{A}$), and capacitance sensor element 35 lies on one side of a line of symmetry within sub-region I, while capacitance sensor element 38 lies on the other side of that line of symmetry. Similarly, both capacitance sensor elements 36 and 37 are connected to input 4 (corresponding to input signal $\overline{B}$), and capacitance sensor element 36 lies on one side of the line of symmetry, while capacitance sensor element 37 lies on the other side of the line of symmetry. Furthermore, the capacitance sensor elements 35-38 are arranged symmetrically according to which of the input signals they produce (and thus which of the inputs they are connected to), in a mirror-image $\overline{A}/\overline{B}/\overline{B}/\overline{A}$ pattern. The capacitance sensor elements in the other sub-regions are similarly arranged in a mirror-image pattern.

In one embodiment, the capacitance sensor elements 35-50 and the inputs 1-4 are connected such that adjacent regions are identified using encoded values that have a Hamming distance of one; that is, they are Gray coded. Thus, only one of the 2 bits changes value from one sub-region to the next.

Capacitance sensing apparatus 300 is advantageous because an object situated at the border between 2 sub-regions is more precisely identified as being so located. That is, for example, the location of an object situated midway, or approximately midway, between capacitance sensor elements 38 and 39 is more precisely identified as being at that location.

If, for example, an object is situated midway between capacitance sensor elements 38 and 39, the resultant signal $\overline{A}$ received at input 2 would be identified as being greater than the signal A received at input 1, and the first bit would therefore be given a value of 1. However, the object is also equidistant from, for example, capacitance sensor elements 37 and 40, so that signals received at inputs 3 and 4 would be about the same in strength. In this manner, the object is identified as being at, or approximately at, the border between sub-regions I and II.

In the example of FIG. 3, if an object is moving from one sub-region to the next, then the signal strength remains the same on one input pair, while the transition in signal strength is smoothly varying on the other input pair. That is, for example, if an object is moving from sub-region I into sub-region II, then the signal strength remains fairly constant on inputs 1 and 2, and the signal strength on input 4 diminishes while the signal strength on input 3 increases.

As previously noted herein, embodiments in accordance with the present invention are not limited to the examples described herein, and the features of the wiring diagram of FIG. 3 can be readily extended to embodiments that include additional capacitance sensor elements per sub-region interconnected with additional pairs of inputs.

Figure 4:
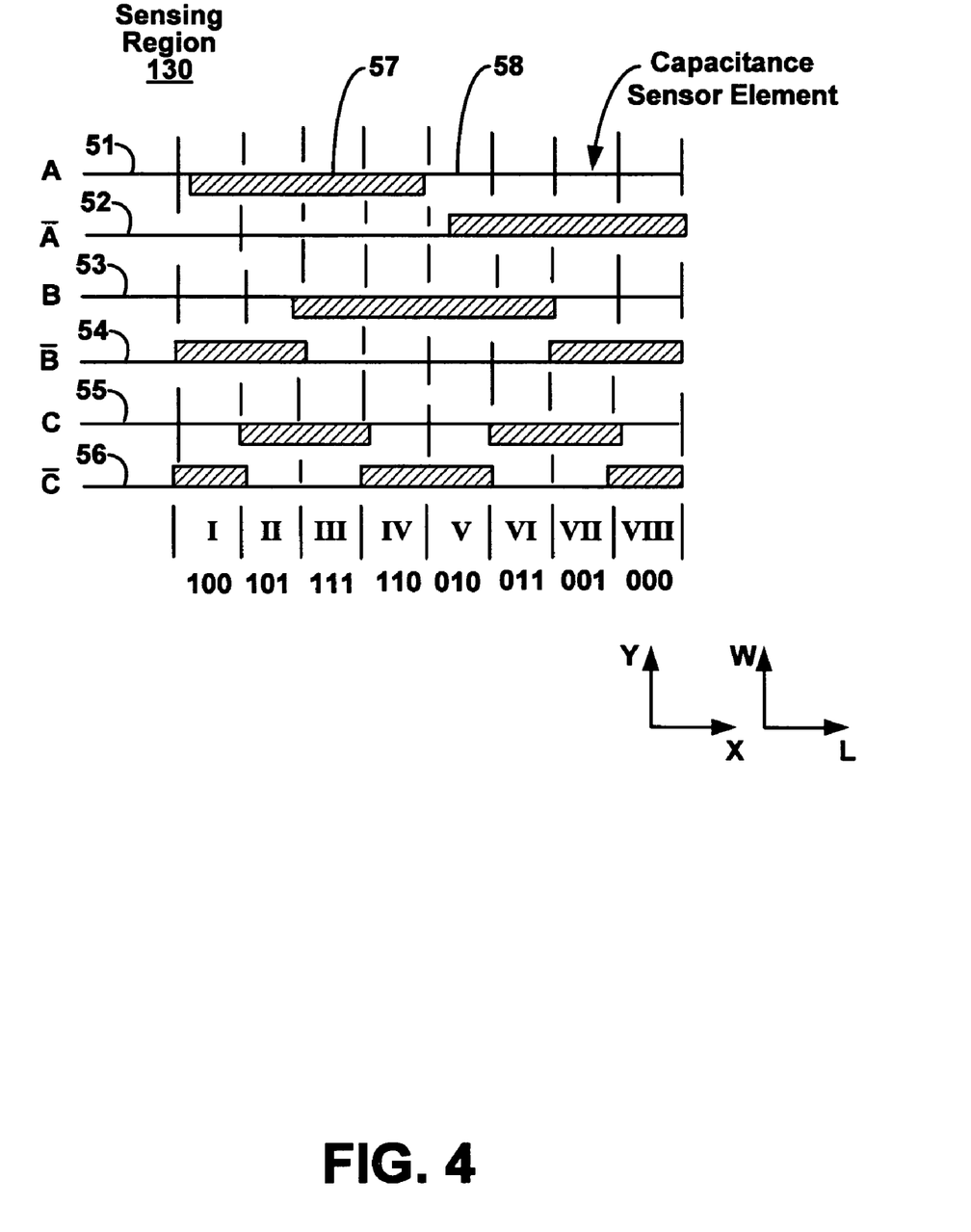
FIG. 4 illustrates capacitance sensing elements according to an embodiment of the present invention.

FIG. 4 illustrates capacitance sensor elements 51-56 according to an embodiment of the present invention. In this embodiment, the capacitance sensor elements 51-56 have widths W that vary along their respective lengths L. When incorporated into a capacitance sensing apparatus such as capacitance sensing apparatus 200 or 300 of FIGS. 2 and 3, the capacitance sensor elements 51-56 can be used to identify a position in 2 dimensions (e.g., in the x-direction and in the y-direction). More specifically, a position can be identified in the y-direction based on which subset of inputs senses a change in capacitance induced by an object in proximity to sensing region 130, as previously described herein. Also, a position can be identified in the x-direction according to the magnitude of the change in capacitance induced by that object. For example, an object in proximity to the wider portion 57 of capacitance sensor element 51 will induce a larger signal than a similar object in proximity to the narrower portion 58.

The example of FIG. 4 conveys only one embodiment of a variable-width capacitance sensor element. Other types of variable-width capacitance sensor elements can be used in accordance with embodiments of the present invention. In particular, capacitance sensor elements in which the width varies in a more continuous fashion, rather than in the discontinuous (e.g., block-like) fashion illustrated in FIG. 4, can be used.

Figure 5:
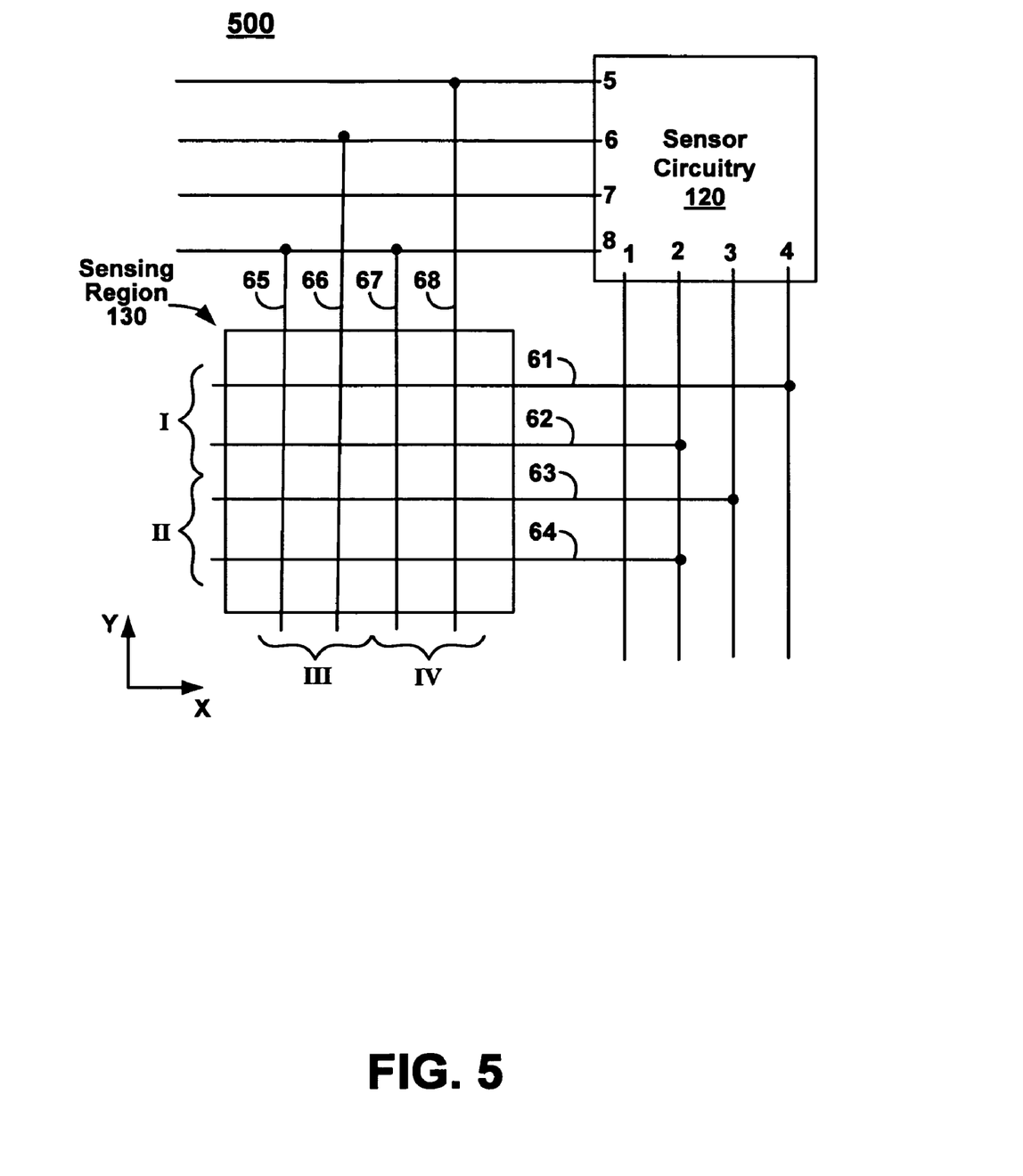
FIG. 5 is another example wiring diagram according to an embodiment of the present invention.

FIG. 5 illustrates an embodiment of a capacitance sensing apparatus 500 according to the present invention. In this example, capacitance sensor elements 61-64 traverse the sensing region 130 in the x-direction, and capacitance sensor elements 65-68 traverse the sensing region 130 in the y-direction. The x-direction and the y-direction may or may not be orthogonal, but they are not parallel.

The capacitance sensor elements 61-68 are electrically coupled (connected) to inputs 1-8 of sensor circuitry 120 in a manner similar to that described above in conjunction with FIGS. 2 and 3. That is, each of the inputs 1-8 of the sensor circuitry 120 may be coupled to more than one capacitance sensor element, such that an unambiguous position in sensing region 130 can be determined based on which subset of the inputs 1-8 senses a change in capacitance when an object is proximate to or in contact with the sensing region 130. More specifically, in a manner similar to that described above in conjunction with FIGS. 2 and 3, capacitance sensor elements 61-64 and inputs 1-4 are used to identify an unambiguous position in the y-direction, and capacitance sensor elements 65-68 and inputs 5-8 are used to identify an unambiguous position in the x-direction.

Although FIG. 5 illustrates 8 capacitance sensor elements and 8 inputs, with 2 sub-regions I and II in the y-direction and 2 sub-regions III and IV in the x-direction, the present invention is not so limited.

Figure 6:
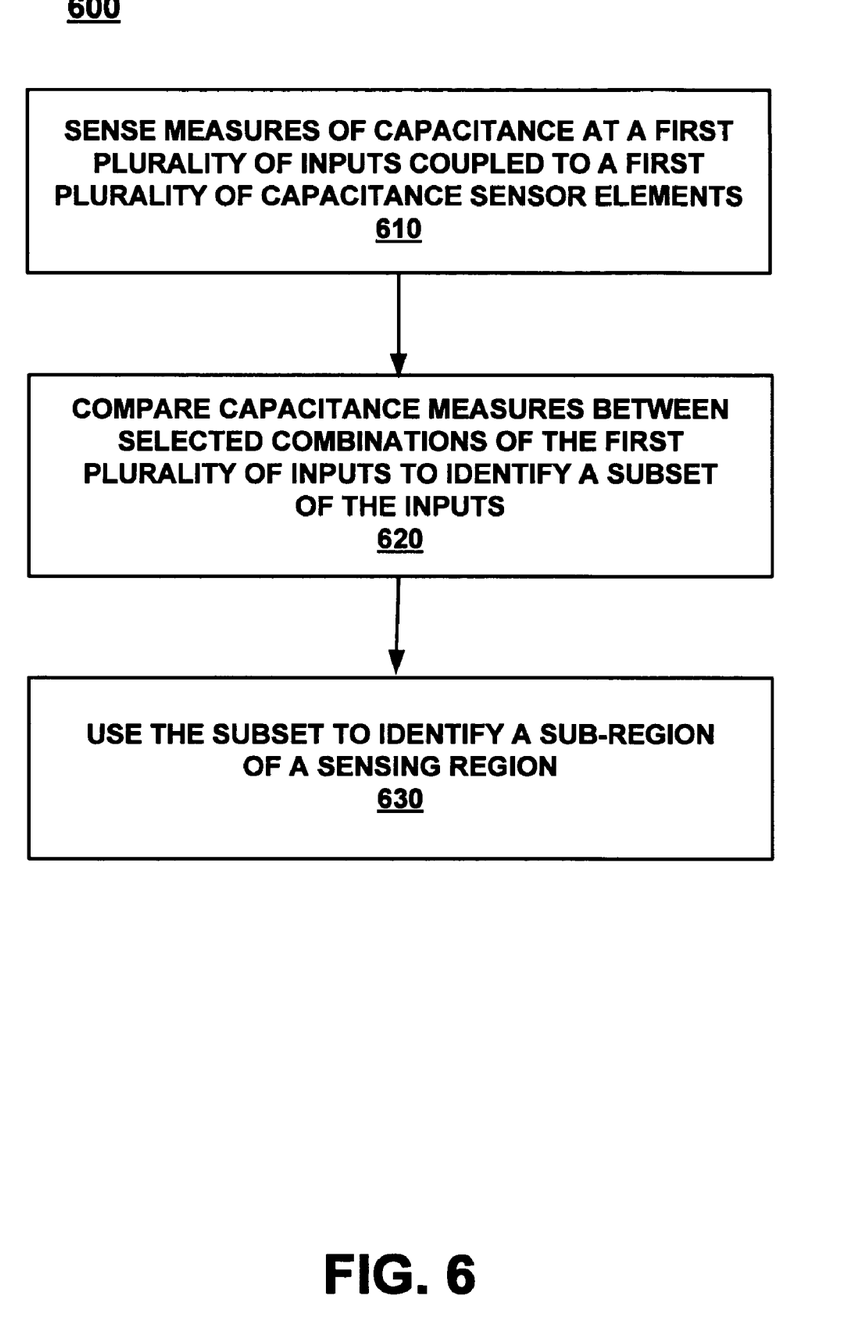
FIG. 6 is a flowchart of a method of sensing position according to an embodiment of the present invention.
Figure 7:
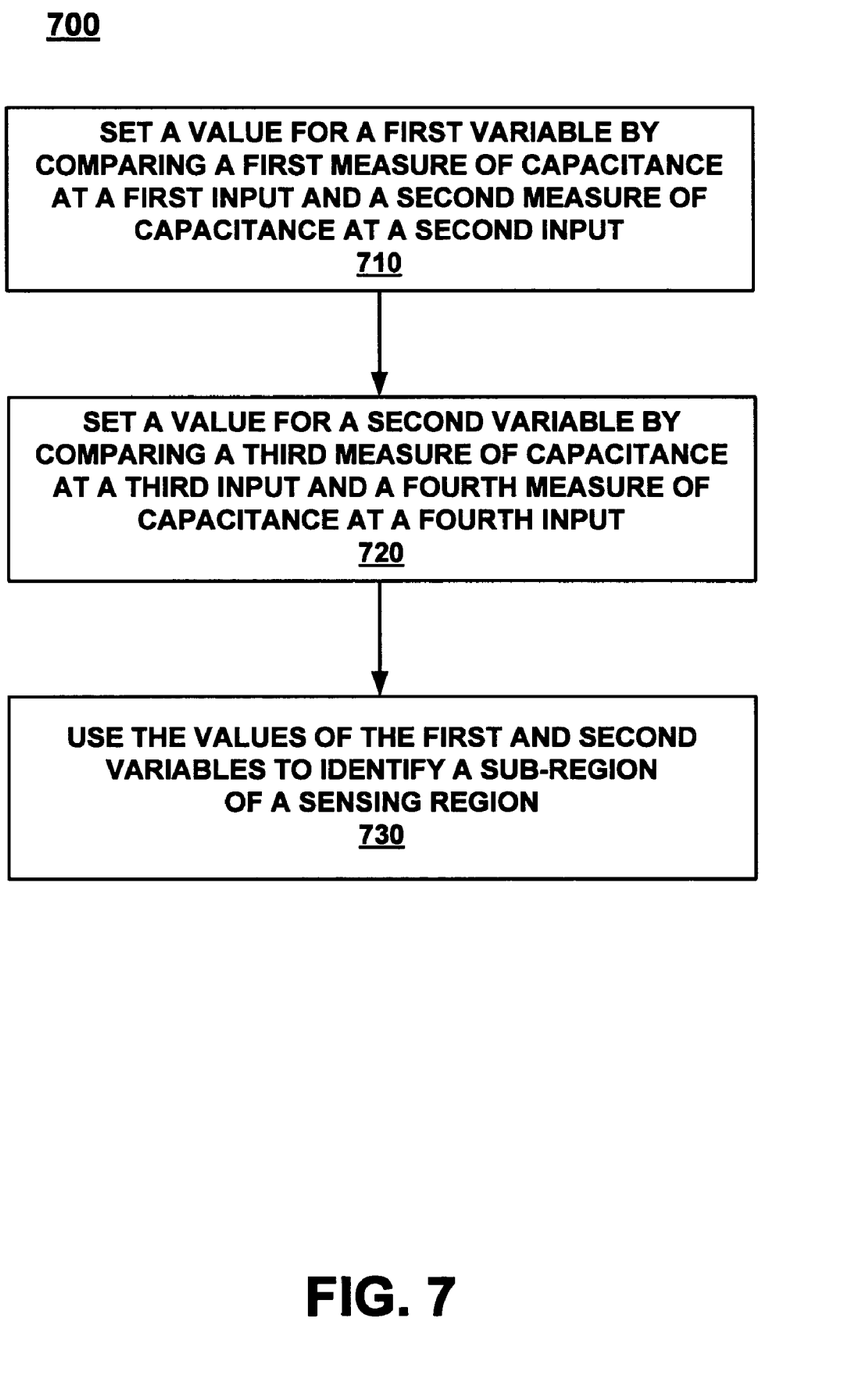
FIG. 7 is a flowchart of a method of sensing position according to another embodiment of the present invention.

FIG. 6 is a flowchart 600 of a method of sensing position according to an embodiment of the present invention. FIG. 7 is a flowchart 700 of a method of sensing position according to another embodiment of the present invention. Although specific steps are disclosed in flowcharts 600 and 700, such steps are exemplary. That is, the present invention is well-suited to performing various other steps or variations of the steps recited in flowcharts 600 and 700. It is appreciated that the steps in flowcharts 600 and 700 may be performed in an order different than presented and that the steps in flowcharts 600 and 700 are not necessarily performed in the sequence illustrated.

With reference first to FIG. 6, in block 610, measures of capacitance at a first plurality of inputs, coupled to a first plurality of capacitance sensor elements that traverse a sensing region, are sensed. As described above, more than one of the capacitance sensor elements are electrically coupled to a same input of the first plurality of inputs, and a change in capacitance is induced in one or more of the capacitance sensor elements when an object is proximate to (e.g., near or in contact with) the sensing region.

In block 620, capacitance measures (e.g., signal strengths) between selected combinations of the first plurality of inputs are compared to identify which subset of the inputs senses the change in capacitance induced by the object.

In block 630, in one embodiment, a sub-region of the sensing region is identified using the subset of inputs identified in block 620. The subset of inputs is encoded as a number value. The position of the object along a first axis of the sensing region unambiguously corresponds to the sub-region that is uniquely associated with the encoded number value.

In one embodiment, measures of capacitance at a second plurality of inputs, coupled to a second plurality of capacitance sensor elements, are also sensed. In such an embodiment, the second plurality of inputs traverses the sensing region orthogonally to the first plurality of capacitance sensor elements, and more than one of the second capacitance sensor elements are coupled to a same input of the second plurality of inputs. In a manner similar to that just described, capacitance measures between selected combinations of the second plurality of inputs are compared to identify which subset of the second plurality of inputs senses a change in capacitance induced by the object. The second subset of inputs is encoded as a second number value, and the position of the object along a second axis of the sensing region unambiguously corresponds to the sub-region that is uniquely associated with the second encoded number value. Thus, in one embodiment, the position of an object can be determined in 2 dimensions.

With reference now to FIG. 7, in block 710, a value of a first variable (e.g., a first bit) is set by comparing a first measure of capacitance (e.g., signal strength) received (sensed) at a first input and a second measure of capacitance received (sensed) at a second input. The first measure is produced by a first capacitance sensor element that traverses a sensing region, and the second measure is produced by a second capacitance sensor element that traverses the sensing region. If the first measure is greater than the second measure, the first bit is given a first value (e.g., 0 or 1 in a binary embodiment); otherwise, the first bit is given another value.

In block 720, a value of a second variable (e.g., a second bit) is set by comparing a third measure of capacitance received (sensed) at a third input and a fourth measure of capacitance received (sensed) at a fourth input. The third measure is produced by a third capacitance sensor element that traverses the sensing region, and the fourth measure is produced by a fourth capacitance sensor element that traverses the sensing region. If the third measure is greater than the fourth measure, the second bit is given one value; otherwise, the second bit is given another value.

In block 730, a particular position along an axis of the sensing region is identified, based on the value of the first variable and the value of the second variable. That is, each possible combination of values of the first and second variables uniquely corresponds to a sub-region of the sensing region. Thus, depending on the values of the first and second variables, a particular sub-region of the sensing region can be unambiguously identified.

In summary, embodiments in accordance with the present invention pertain to capacitance sensing apparatuses, and methods thereof, that use a large number of capacitance sensor elements interconnected with a relatively few number of inputs to unambiguously identify an object's position within a sensing region. Because fewer inputs are needed to accommodate the relatively large number of capacitance sensor elements, costs can be reduced even though accuracy and signal-to-noise ratios are improved.

In addition to determining position, or as an alternative to determining position, embodiments of the capacitive sensing apparatuses described herein can be used to detect movement, or a rate of movement, of an object or finger relative to a sensing region. Also, the features of the various embodiments described herein can be used alone or in combination.

The examples discussed herein pertain to the sensing of a single object. However, embodiments of the present invention can be used to sense multiple objects that are in proximity to the sensing region at the same time. For example, the sub-region addresses can be defined such that the sum of any 2 addresses does not equal the address of any other sub-region. Consequently, if a signal is received that generates an invalid address, then a check can be performed to determine if the address is representative of the sum signals received at 2 other valid addresses. If so, then it is possible to deduce that there are actually 2 objects in proximity to the sensing region, and it may also be possible to derive the 2 locations of those 2 objects. Even if it is not possible to derive the 2 locations, it is generally still possible to ascertain that there are indeed at least 2 objects in proximity to the sensing region.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitance sensing apparatus comprising:
a first plurality of capacitance sensor elements comprising first, second, third and fourth capacitance sensor elements that traverse a region, wherein a change in capacitance is induced in at least one of said capacitance sensor elements when an object is proximate to said region; and
sensor circuitry having a first plurality of inputs comprising first, second, third and fourth inputs;
wherein a comparison of a first measure of capacitance received at said first input and a second measure of capacitance received at said second input is used in setting a value of a first variable, said first and second measures respectively produced by said first and second capacitance sensor elements, and wherein a comparison of a third measure of capacitance sensed at said third input and a fourth measure of capacitance sensed at said fourth input is used in setting a value of a second variable, said third and fourth measures respectively produced by said third and fourth capacitance sensor elements; and
wherein a position along an axis of said region corresponds to said value of said first variable and said value of said second variable.

2. The apparatus of claim 1 wherein said first, second, third and fourth capacitance sensor elements have widths that vary along their respective lengths.

3. The apparatus of claim 1 further comprising a second plurality of second capacitance sensor elements that traverses said region orthogonally to said first plurality of capacitance sensor elements.

4. The apparatus of claim 1 wherein said value of said first variable and said value of said second variable comprise a number value that uniquely identifies a sub-region of said region.

5. The apparatus of claim 1 wherein said value of said first variable and said value of said second variable uniquely identify a sub-region of said region, wherein said sub-region is traversed by a plurality of pairs of capacitance sensor elements, wherein both capacitance sensor elements in a pair are electrically coupled to a same input and wherein one capacitance sensor element of said pair is disposed on one side of a line of symmetry that intersects said sub-region and the other capacitance sensor element of said pair is disposed on the other side of said line of symmetry, and wherein said capacitance sensor elements in said sub-region are arranged in a symmetrical pattern according to which of said inputs said capacitance sensor elements are electrically coupled.

6. A method of determining a position in a region of a capacitance sensing apparatus, said method comprising:
setting a value of a first variable by comparing a first measure of capacitance received at a first input and a second measure of capacitance received at a second input, said first measure produced by a first capacitance sensor element that traverses said region and said second measure produced by a second capacitance sensor element that traverses said region; and
setting a value of a second variable by comparing a third measure of capacitance sensed at a third input and a fourth measure of capacitance sensed at a fourth input, said third measure produced by a third capacitance sensor element that traverses said region and said fourth measure produced by a fourth capacitance sensor element that traverses said region;
wherein a position along an axis of said region corresponds to said value of said first variable and said value of said second variable.

7. The method of claim 6 wherein said first, second, third and fourth capacitance sensor elements have widths that vary along their respective lengths.

8. The method of claim 6 further comprising sensing measures of at a second plurality of second capacitance sensor elements that traverses said region orthogonally to said first plurality of capacitance sensor elements.

9. The method of claim 6 wherein said value of said first variable and said value of said second variable comprise a number value that uniquely identifies a sub-region of said region.

10. The method of claim 6 wherein said value of said first variable and said value of said second variable uniquely identify a sub-region of said region, wherein said sub-region is traversed by a plurality of pairs of capacitance sensor elements, wherein both capacitance sensor elements in a pair are electrically coupled to a same input and wherein one capacitance sensor element of said pair is disposed on one side of a line of symmetry that intersects said sub-region and the other capacitance sensor element of said pair is disposed on the other side of said line of symmetry, and wherein said capacitance sensor elements in said sub-region are arranged in a symmetrical pattern according to which of said inputs said capacitance sensor elements are electrically coupled.

11. A sensing apparatus comprising:
sensor circuitry having a plurality of inputs comprising a first input, a second input, a third input and a fourth input; and
a region having a plurality of sub-regions and a first plurality of capacitance sensor elements, said sub-regions comprising a first sub-region comprising a first capacitance sensor element electrically coupled to said second input and a second capacitance sensor element electrically coupled to said fourth input, a second sub-region comprising a third capacitance sensor element electrically coupled to said second input and a fourth capacitance sensor element electrically coupled to said third input, a third sub-region comprising a fifth capacitance sensor element electrically coupled to said first input and a sixth capacitance sensor element electrically coupled to said third input, and a fourth sub-region comprising a seventh capacitance sensor element electrically coupled to said first input and an eighth capacitance sensor element electrically coupled to said fourth input;
wherein a change in capacitance is induced in one or more of said capacitance sensor elements when an object is proximate to said region; wherein said sensor circuitry compares a first measure of capacitance sensed at said first input and a second measure of capacitance sensed at said second input to set a value for a first variable, and wherein said sensor circuitry compares a third measure of capacitance sensed at said third input and a fourth measure of capacitance sensed at said fourth input to set a value for a second variable; and wherein a sub-region of said plurality of sub-regions is uniquely identifiable according to values of said first and second variables such that a position of said object along an axis of said region can be determined.

12. The apparatus of claim 11 wherein said capacitance sensor elements have widths that vary along their respective lengths.

13. The apparatus of claim 11 further comprising a second plurality of second capacitance sensor elements that traverses said region orthogonally to said first plurality of capacitance sensor elements.

14. The apparatus of claim 11 wherein said first sub-region further comprises a ninth capacitance sensor element electrically coupled to said second input and a tenth capacitance sensor element electrically coupled to said fourth input, and wherein said first and second capacitance sensor elements are disposed on one side of a line of symmetry that intersects said sub-region and said ninth and tenth capacitance sensor elements are disposed on the other side of said line of symmetry in a mirror-image pattern according to which of said second and fourth inputs said first, second, ninth and tenth capacitance sensor elements are electrically coupled.

15. The apparatus of claim 14 comprising 2N inputs, $2^N$ sub-regions and N capacitance sensor elements per sub-region, where N is a positive integer.

16. A capacitance sensing apparatus comprising:
capacitance sensor elements traversing a region, wherein said capacitance sensor elements are configured with widths that vary along their respective lengths to identify a position of said object along a second axis of said region; and
sensor circuitry having a first plurality of inputs, wherein more than one of said capacitance sensor elements are electrically coupled to a same input of said first plurality of inputs,
wherein a position of an object along a first axis of said region is identified according to which subset of a plurality of subsets of said first plurality of inputs senses a change in capacitance that is induced when said object is proximate to said region, and
wherein said capacitance sensor elements are configured for identifying a position of said object along a second axis of said region, said second axis being non-parallel to said first axis.

17. The capacitance sensing apparatus of claim 16 wherein said capacitance sensor elements, which are configured for identifying a position of said object along a second axis of said region, comprise capacitance sensor elements that are disposed non-parallel to said first axis; and
a second plurality of inputs, wherein more than one of said capacitance sensor elements that are disposed non-parallel to said first axis are coupled to a same input of said second plurality of inputs.

18. A capacitance sensing apparatus comprising:
capacitance sensor elements traversing a region; and
sensor circuitry having a first plurality of inputs, wherein more than one of said capacitance sensor elements are electrically coupled to a same input of said first plurality of inputs, wherein a subset of said first plurality of inputs uniquely identifying a sub-region of said region, wherein said subset of said first plurality of inputs is encoded as a number value that is unique to said sub-region, wherein a position of an object along a first axis of said region is identified according to which subset of a plurality of subsets of said first plurality of inputs senses a change in capacitance that is induced when said object is proximate to said region, and wherein said capacitance sensor elements are configured for identifying a position of said object along a second axis of said region, said second axis being non-parallel to said first axis.

19. The capacitance sensing apparatus of claim 18 wherein said number value is a binary number.

20. The capacitance sensing apparatus of claim 19 wherein said region comprises a plurality of sub-regions, wherein said capacitance sensor elements and said first plurality of inputs are connected such that adjacent sub-regions of said plurality of sub-regions are identified by encoded number values that have a Hamming distance of one.

21. The capacitance sensing apparatus of claim 19 wherein said region comprises a plurality of sub-regions, wherein said capacitance sensor elements and said first plurality of inputs are connected such that adjacent sub-regions of said plurality of sub-regions are identified by encoded number values that have a Hamming distance of at least two.

22. The capacitance sensing apparatus of claim 19 wherein said region comprises a plurality of sub-regions, wherein said capacitance sensor elements and said first plurality of inputs are connected such that adjacent sub-regions of said plurality of sub-regions are identified by encoded number values that are run length limited with a run length of at least two.

23. A capacitance sensing apparatus comprising:
capacitance sensor elements traversing a region; and
sensor circuitry having a first plurality of inputs, wherein more than one of said capacitance sensor elements are electrically coupled to a same input of said first plurality of inputs, wherein a subset of said first plurality of inputs uniquely identifies a sub-region of said region, wherein said sub-region is traversed by a plurality of pairs of capacitance sensor elements, wherein both capacitance sensor elements in a pair of said plurality of pairs are electrically coupled to a same input of said subset and wherein one capacitance sensor element of said pair is disposed on one side of a line of symmetry that intersects said sub-region and the other capacitance sensor element of said pair is disposed on the other side of said line of symmetry, and wherein capacitance sensor elements of said plurality of pairs in said sub-region are arranged in a symmetrical pattern according to which inputs of said subset of inputs said capacitance sensor elements of said plurality of pairs are electrically coupled, wherein a position of an object along a first axis of said region is identified according to which subset of a plurality of subsets of said first plurality of inputs senses a change in that is induced when said object is proximate to said region, and wherein said capacitance sensor elements are configured for identifying a position of said object along a second axis of said region, said second axis being non-parallel to said first axis.

24. A method of sensing a position of an object proximate to a region, said method comprising:
sensing measures of capacitance at a first plurality of inputs coupled to a first plurality of capacitance sensor elements that traverse said region, wherein more than one capacitance sensor element of said capacitance sensor elements are electrically coupled to a same input of said first plurality of inputs, wherein said capacitance sensor elements have widths that vary along their respective lengths, wherein a change in capacitance is induced in one or more of said more than one capacitance sensor element of said capacitance sensor elements when said object is proximate to said region; and
comparing capacitance measures between selected combinations of said first plurality of inputs to identify which subset of said first plurality of inputs senses said change in capacitance, wherein a position of said object along an axis of said region unambiguously corresponds to which of said first plurality of inputs are members of said subset.

25. The method of claim 24 further comprising sensing measures of capacitance at a second plurality of inputs coupled to a second plurality of capacitance sensor elements that traverses said region orthogonally to said first plurality of capacitance sensor elements, wherein more than one of said second plurality of capacitance sensor elements are coupled to a same input of said second plurality of inputs.

26. A method of sensing a position of an object proximate to a region, said method comprising:
sensing measures of capacitance at a first plurality of inputs coupled to a first plurality of capacitance sensor elements that traverse said region, wherein more than one capacitance sensor element of said capacitance sensor elements are electrically coupled to a same input of said first plurality of inputs, wherein a change in capacitance is induced in one or more of said more than one capacitance sensor element of said capacitance sensor elements when said object is proximate to said region;
comparing capacitance measures between selected combinations of said first plurality of inputs to identify which subset of said first plurality of inputs senses said change in capacitance;
identifying a sub-region of said region using said subset of said first plurality of inputs; and
encoding said subset of said first plurality of inputs as a number value that is unique to said sub-region, wherein a position of said object along an axis of said region unambiguously corresponds to which of said first plurality of inputs are members of said subset.

27. A method of sensing a position of an object proximate to a region, said method comprising:
sensing measures of capacitance at a first plurality of inputs coupled to a first plurality of capacitance sensor elements that traverse said region, wherein more than one capacitance sensor element of said capacitance sensor elements are electrically coupled to a same input of said first plurality of inputs, wherein a change in capacitance is induced in one or more of said more than one capacitance sensor element of said capacitance sensor elements when said object is proximate to said region;
comparing capacitance measures between selected combinations of said first plurality of inputs to identify which subset of said first plurality of inputs senses said change in capacitance; and
identifying a unique sub-region of said region using said subset of said first plurality of inputs, wherein said sub-region is traversed by a plurality of pairs of said first plurality of capacitance sensor elements, wherein both capacitance sensor elements in a pair of said plurality of pairs are electrically coupled to a same input of said subset and wherein one capacitance sensor element of said pair is disposed on one side of a line of symmetry that intersects said sub-region and the other capacitance sensor element of said pair is disposed on the other side of said line of symmetry, and wherein capacitance sensor elements of said plurality of pairs in said sub-region are arranged in a symmetrical pattern according to which inputs of said subset of inputs said capacitance sensor elements of said plurality of pairs are electrically coupled, wherein a position of said object along an axis of said region unambiguously corresponds to which of said first plurality of inputs are members of said subset.

* * * * *